(12) United States Patent
Kubo et al.

(10) Patent No.: US 10,664,951 B2
(45) Date of Patent: May 26, 2020

(54) DISPLAY CONTROL DEVICE AND DISPLAY CONTROL METHOD

(71) Applicant: TOYOTA JIDOSHA KABUSHIKI KAISHA, Toyota-shi (JP)

(72) Inventors: Chikage Kubo, Chofu (JP); Takuji Yamada, Musashino (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/299,273

(22) Filed: Mar. 12, 2019

(65) Prior Publication Data

US 2019/0287214 A1 Sep. 19, 2019

(30) Foreign Application Priority Data

Mar. 19, 2018 (JP) .................... 2018-051538

(51) Int. Cl.
*G06K 9/00* (2006.01)
*G06F 3/16* (2006.01)
*G06T 3/20* (2006.01)
*G01C 21/36* (2006.01)

(52) U.S. Cl.
CPC .............. *G06T 3/20* (2013.01); *G06F 3/167* (2013.01); *G01C 21/3679* (2013.01); *G06K 9/00805* (2013.01)

(58) Field of Classification Search
None
See application file for complete search history.

(56) References Cited

U.S. PATENT DOCUMENTS 8,818,716 B1* 8/2014 El Dokor ............... G01C 21/00
701/426
2017/0309257 A1* 10/2017 Akita ..................... B60K 35/00

FOREIGN PATENT DOCUMENTS

JP 2010-127779 * 6/2010

* cited by examiner

*Primary Examiner* — Yanna Wu
(74) *Attorney, Agent, or Firm* — Oblon, McClelland, Maier & Neustadt, L.L.P.

(57) ABSTRACT

A display control device configured to display an image on a display mounted on a vehicle, the display control device includes circuitry configured to: acquire positional information of the vehicle; derive supply information about an object around the vehicle based on attribute information of a driver of the vehicle and the positional information, the supply information being supplied to the driver; display a character on the display; cause an output device to output the supply information; and display the character directing a sightline toward the object on the display.

13 Claims, 3 Drawing Sheets

DISPLAY CONTROL DEVICE AND DISPLAY CONTROL METHOD

INCORPORATION BY REFERENCE

The disclosure of Japanese Patent Application No. 2018-051538 filed on Mar. 19, 2018 including the specification, drawings and abstract is incorporated herein by reference in its entirety.

BACKGROUND

1. Technical Field

The disclosure relates to a display control device and a display control method.

2. Description of Related Art

Japanese Unexamined Patent Application Publication No. 2010-127779 (JP 2010-127779 A) discloses an information supply device including a current position detecting portion, a sightline detecting portion configured to detect a sightline of an occupant, a character device configured to exhibit a sightline in any given direction by a three-dimensional operation, a speaker and a monitor configured to output feature data, and a controlling portion. When a feature around a current position is searched, the controlling portion directs the sightline of the character device toward the occupant and detects eye contact between the occupant and the character device. When the eye contact is detected, the controlling portion directs the sightline of the character device toward the feature and determines whether the occupant has conjugate gaze to look in a direction where the character device looks, based on a detection result of the sightline detecting portion. When the conjugate gaze is detected, the information supply device outputs data of the feature, and when the conjugate gaze is not detected, the information supply device does not output data of the feature.

SUMMARY

JP 2010-127779 A discloses a technique to output data of a feature on a sightline of a driver when the driver moves the sightline following movement of the character device. However, since the data of the feature is output regardless of an interest of the driver, it is unclear whether or not the driver is interested in the feature.

The disclosure provides a technique to effectively supply information to a driver and allow the driver to easily recognize the information.

A display control device according to a first aspect of the disclosure includes circuitry configured to: acquire positional information of the vehicle; derive supply information about an object around the vehicle based on attribute information of a driver of the vehicle and the positional information, the supply information being supplied to the driver; display a character on the display; cause an output device to output the supply information; and display the character directing a sightline toward the object on the display.

According to the first aspect, by supplying information of an object around the vehicle based on the attribute information of the driver, it is possible to effectively supply, to the driver, information estimated to attract an interest of the driver. Further, the sightline of the character is directed toward the object, so that the driver can easily recognize the object.

A display control method according to a second aspect of the disclosure is a method for displaying an image on a display mounted on a vehicle and controlled by a display control device. The display control method includes: acquiring, by the display control device, positional information of a vehicle; deriving, by the display control device, supply information about an object around the vehicle based on attribute information of a driver of the vehicle and the positional information, the supply information being supplied to the driver; outputting, by an output device, the supply information; and displaying, by the display control device, a character directing a sightline toward the object on the display.

According to the second aspect, by supplying information of an object around the vehicle based on the attribute information of the driver, it is possible to effectively supply, to the driver, information estimated to attract an interest of the driver. Further, the sightline of the character is directed toward the object, so that the driver can easily recognize the object.

With the disclosure, it is possible to provide a technique to effectively supply information to a driver and allow the driver to easily recognize the information.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
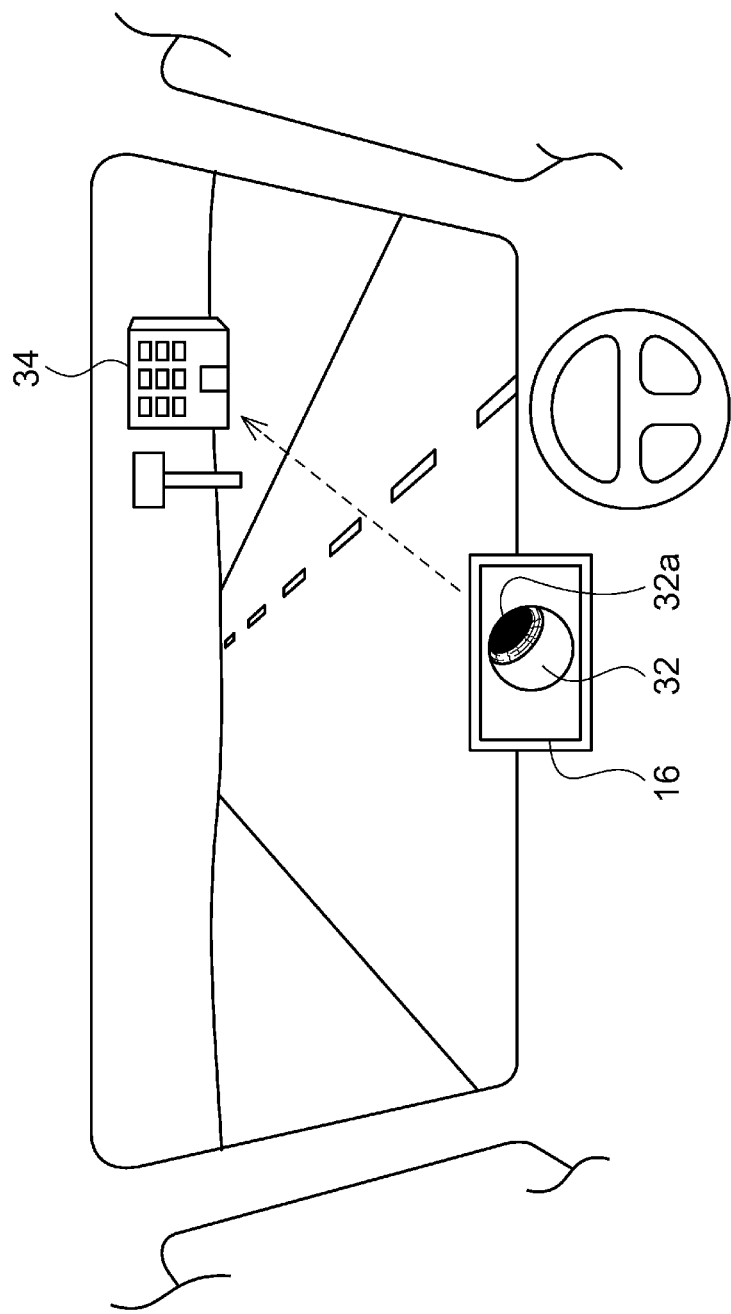
FIG. 1 is a view to describe a display control system of an embodiment.

FIG. 1 is a view to describe a display control system of an embodiment. The display control system controls a character 32 displayed on a display 16 provided in a vehicle so that the character 32 moves. The display 16 may be a display on which a two-dimensional image is displayed or may be a display on which a three-dimensional image is displayed. The character 32 has an eye and is configured to show a sightline of the character 32 by a position and a shape of a pupil 32a included in the eye. The character 32 illustrated in FIG. 1 is constituted by only the eye, but the character 32 may be constituted by a human or an animal having the eye.

When the display control system 1 informs an occupant in the vehicle about an object 34, the display control system 1 shows a position of the object 34 by the sightline of the character 32 in addition to information supply by sound. Hereby, the occupant can easily grasp the object 34 around the vehicle.

The character 32 is displayed by an animation on the display 16 by execution of an agent program. The agent program supports driving of a driver by exchanging information with the occupant, supplying information by sound and/or image, and supplying information related to running while the vehicle runs. The character 32 may be displayed to be superimposed on an image indicative of a predetermined function. For example, the character 32 may be displayed to be superimposed on a map displayed as a destination guide function.

The object 34 may be a facility that suits the preference of the driver, a destination set in a navigation device, or an obstacle that can obstruct vehicle running. The supply of information of the object 34 to the occupant during vehicle running can make the occupant interested in the object 34 or support the driving.

Figure 2:
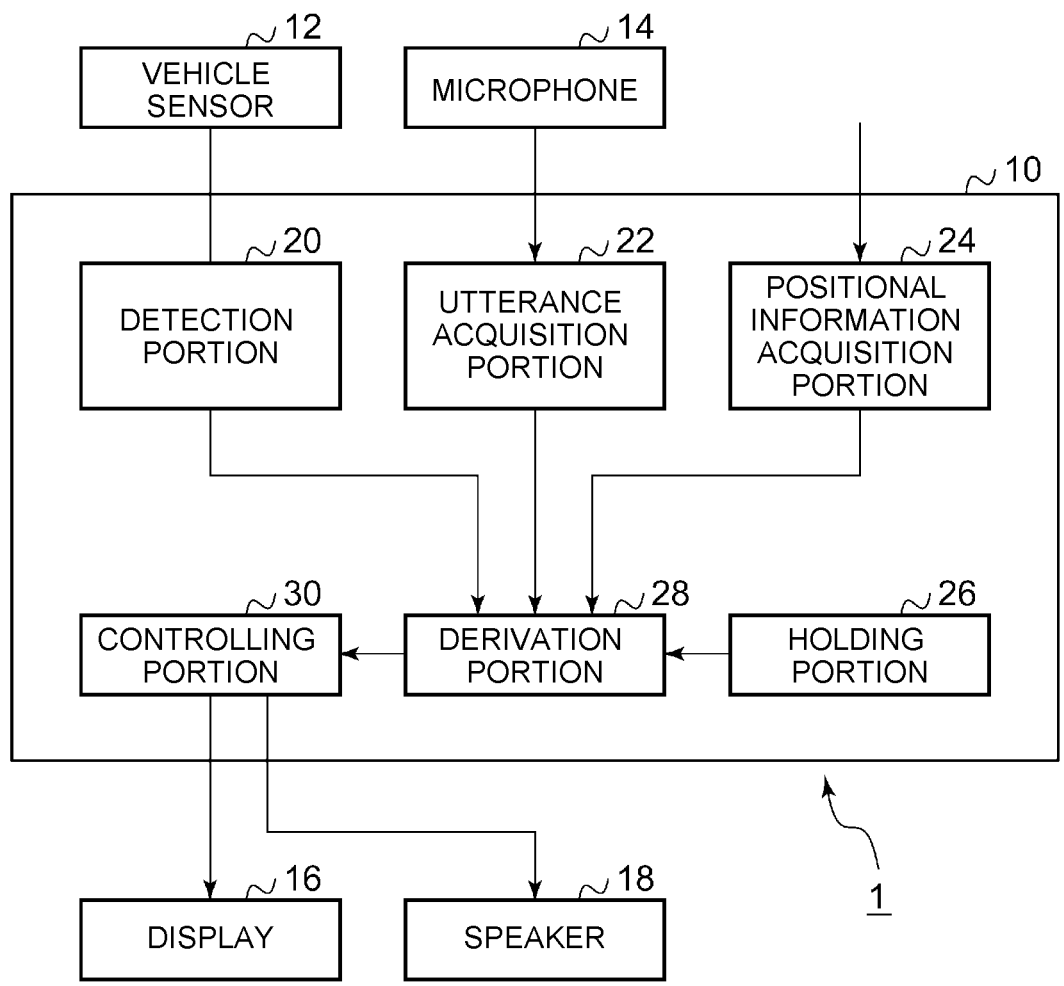
FIG. 2 is a view to describe a functional configuration of the display control system.

FIG. 2 is a view to describe a functional configuration of the display control system 1. In FIG. 2, elements described as functional blocks that perform various processes can be each constituted by a circuit block, a memory, or other LSI in terms of hardware and can be each implemented by a program and the like loaded in a memory in terms of software. Accordingly, it is understandable for a person skilled in the art that these functional blocks can be implemented in various manners only by hardware, only by software, or by combinations thereof, and they are not limited to any manner.

The display control system 1 includes a display control device 10, a vehicle sensor 12, a microphone 14, the display 16, and a speaker 18. The display control device 10 includes a detecting portion 20, an utterance acquisition portion 22, a positional information acquisition portion 24, a holding portion 26, a derivation portion 28, and a controlling portion 30.

The vehicle sensor 12 detects an object around the vehicle and sends a detection result to the detecting portion 20. The vehicle sensor 12 may be any of an acoustic wave sensor configured to output an acoustic wave and detect an object by a reflected wave of the acoustic wave, a millimeter wave sensor configured to output a millimeter wave and detect an object by a reflected wave of the millimeter wave, and an image sensor configured to capture a peripheral region around the vehicle and acquire a captured image, or the vehicle sensor 12 may be constituted by a combination of any of the above sensors. By a detection result of the vehicle sensor 12, the display control device 10 can acquire information indicative of a distance from the object and a direction of the object. The object detected by the vehicle sensor 12 includes objects such as a human, a vehicle, a guard rail, and a wall that can become an obstacle to running.

The microphone 14 is provided so as to detect a sound inside the vehicle and is configured to convert the sound including an utterance of the occupant into an electric signal and transmit the signal to the display control device 10. A plurality of microphones 14 is provided such that the microphones 14 are placed at different positions in the vehicle. The display control device 10 can acquire the utterance of the occupant from sound information detected by the microphones 14. By providing the microphones 14, a position of the occupant who has made the utterance can be specified by a difference in sound volume between detection results of the microphones 14. The microphones 14 are provided at four places, e.g., the front side, the rear side, the right side, and the left side of the vehicle, for example.

The display 16 is controlled by the display control device 10 and displays a character of an agent by an animation. The display 16 is placed between a driver seat and a front passenger seat so as to be provided on a dashboard or a center console such that the display 16 is placed ahead of the driver seat and the front passenger seat. The display 16 may be a head-up display configured such that an image is projected on a windshield placed ahead of the driver so that a display image as a virtual image is displayed so as to be superimposed on an actual scene. By use of the head-up display, the driver can obtain information of the virtual image with rarely moving the sightline of the driver while the vehicle runs. The speaker 18 is controlled by the controlling portion 30 so as to output audio information of the agent.

The detecting portion 20 of the display control device 10 receives a detection result of the vehicle sensor 12, so as to detect an object around the vehicle and detect a position of the object from a host vehicle.

The utterance acquisition portion 22 acquires an utterance of the occupant from pieces of sound information detected by the microphones 14. The utterance acquisition portion 22 specifies a position of the occupant based on a difference between sound volumes of the pieces of sound information detected by the microphones 14.

The positional information acquisition portion 24 acquires positional information of the vehicle by use of a global positioning system (GPS), and for example, acquires the positional information of the vehicle from the navigation device.

The holding portion 26 holds attribute information of the driver. The attribute information of the driver includes sex, generation, preference information, and the like of the driver. The preference information of the driver includes preference information of food and drink and preference information of goods such as a camera and an automobile. The preference information of the driver may be generated by an utterance of the driver, the utterance being acquired by the utterance acquisition portion 22, or the preference information of the driver may be generated by a moving history of the driver, the moving history being specified based on the positional information of the vehicle and map information.

The holding portion 26 holds map information of objects such as restaurants and tourist facilities. The map information includes positional information of objects, attribute information of the objects, and guide information of the objects.

The derivation portion 28 derives supply information based on a detection result of the detecting portion 20. The supply information is information to inform the driver about the presence of an object around the vehicle. For example, in a case where the detecting portion 20 detects a passing vehicle or in a case where the detecting portion 20 detects an object projecting in a travelling direction of the vehicle, the derivation portion 28 derives supply information to inform the driver about the presence of the object. The derivation portion 28 derives supply information to urge the driver to pay attention, e.g., "please look ahead carefully," and transmits positional information of the object and the supply information to the controlling portion 30.

Further, the derivation portion 28 derives supply information that responds to the utterance, of the occupant, that is acquired by the utterance acquisition portion 22, and achieves communication. In order to respond to the utterance of the driver, the derivation portion 28 may acquire supply information from a server device via a network. The derivation portion 28 transmits, to the controlling portion 30, the supply information that responds to the occupant and positional information of the occupant who makes the utterance.

Further, the derivation portion 28 derives supply information to be supplied to the driver based on the positional information of the vehicle. For example, the derivation portion 28 derives supply information to inform the driver about a facility placed around the vehicle and positional information of the facility. The derivation portion 28 derives supply information, "there is a facility A to the right front side," and transmits the supply information and positional information of the "facility A" to the controlling portion 30.

Further, based on the positional information of the vehicle and the attribute information of the driver, the derivation portion 28 derives supply information to be supplied to the driver in terms of an object around the vehicle and positional information of the object. For example, when the derivation portion 28 finds a facility that suits the preference of the driver around the vehicle by referring to the attribute information of the driver, the derivation portion 28 derives supply information that informs the driver about the facility. The derivation portion 28 transmits the derived positional information of the object and the derived supply information to the controlling portion 30. Hereby, it is possible to effectively provide information estimated to attract an interest of the driver.

The controlling portion 30 generates an image of the character 32 and causes the display 16 to display the character 32. The controlling portion 30 determines a sightline of the character 32 based on a derivation result of the derivation portion 28.

The controlling portion 30 receives the positional information of the object and the supply information about the object from the derivation portion 28 so as to output the supply information in the form of an image and/or a sound, and the controlling portion 30 displays the character 32 such that the sightline of the character 32 is directed toward the object. Hereby, the occupant can easily grasp the position of the object.

Further, the controlling portion 30 receives, from the derivation portion 28, the supply information that responds to the occupant and the positional information of the occupant inside the vehicle and displays the character 32 such that the sightline of the character 32 is directed toward the position of the occupant. This shows that the agent program responds to the occupant who makes the utterance. For example, the controlling portion 30 displays an image in which the sightline of the character 32 is directed toward the occupant who utters a trigger phrase registered in advance, and until a session with the occupant is finished, the controlling portion 30 keeps the sightline of the character 32 directed toward the occupant. The trigger phrase is a word that requests a session start to the agent program of the controlling portion 30.

Figure 3A:
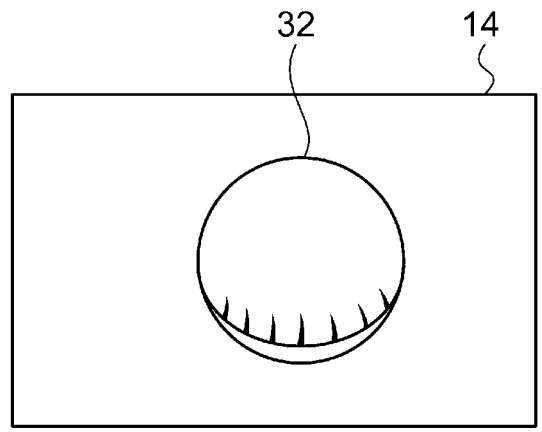
FIG. 3A is a view to describe a first example of a sightline of a character.
Figure 3B:
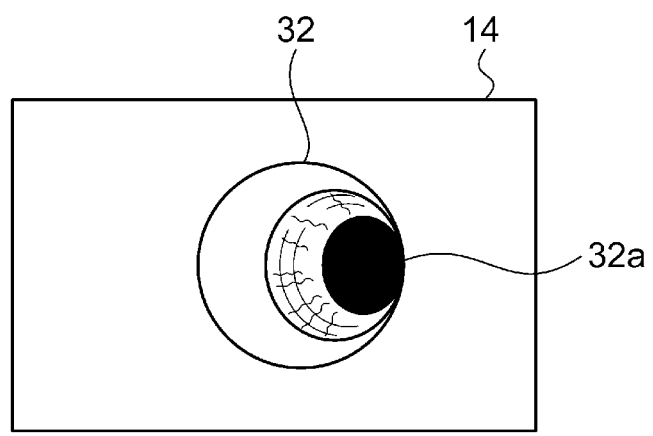
FIG. 3B is a view to describe a second example of the sightline of the character.
Figure 3C:
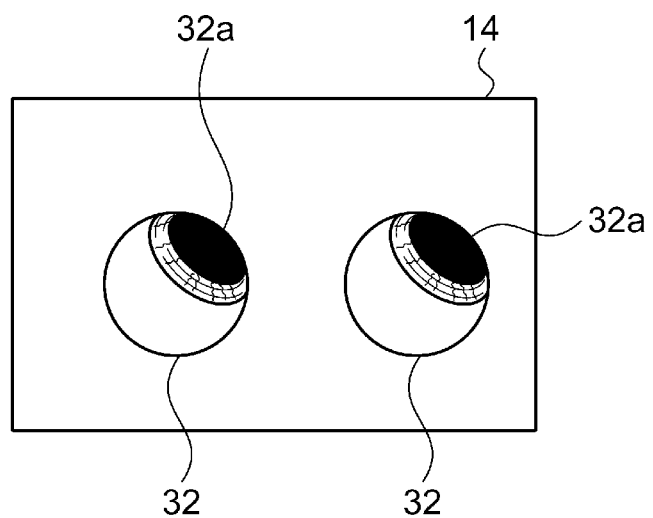
FIG. 3C is a view to describe a third example of the sightline of the character.

FIGS. 3A, 3B, 3C are views to describe the sightline of the character 32. FIG. 3A is an image indicating a state where the character 32 closes the eye, that is, a state where the agent program of the character 32 stands by.

FIG. 3B illustrates a state where the pupil 32*a* including an iris moves to the right side. When the utterance acquisition portion 22 acquires a trigger phrase uttered by an occupant sitting on the right seat, the controlling portion 30 displays the character 32 by moving the pupil 32*a* to the right side so that the sightline is directed toward the occupant sitting on the right seat. Hereby, the occupant sitting on the right seat can recognize that the agent program is in an active state and responds to the occupant. Further, in a case where the pupil 32*a* moves to the right side when the occupant sitting on the right seat does not make any utterance, the occupant can recognize that an object indicated by supply information is placed to the right side from the vehicle. For example, in a case where information of an object placed to the right side from the vehicle is supplied, the position of the object is also indicated by the pupil 32*a* of the character 32, so that the occupant can easily recognize the object.

FIG. 3C illustrates a state where the character 32 is displayed with a pair of eyes and the sightline of the character 32 is directed toward an object placed to the right front side from the vehicle. In a case where the sightline is directed ahead of the vehicle, the pupil 32*a* of the character 32 moves to an outer edge of the eye so as to move to the backside. In FIG. 3B, the whole pupil 32*a* is displayed, but in FIG. 3C, a part of the pupil 32*a* is displayed such that the pupil 32*a* is partially lacked as if the pupil 32*a* partially moves to the backside. The controlling portion 30 displays the pupil 32*a* such that the pupil 32*a* moves within a circular eye, and hereby, the controlling portion 30 can indicate a direction of the object to the occupant who sees the movement.

FIGS. 3A, 3B, 3C illustrate examples in which the sightline is changed by changing the position of the pupil 32*a*. However, a method of expressing the change of the sightline is not limited to a method of changing the position of the pupil 32*a*, provided that the occupant can recognize what the sightline of the character 32 indicates.

There are the following cases: a case where the controlling portion 30 directs the sightline of the character 32 toward the occupant inside the vehicle; and a case where the controlling portion 30 directs the sightline of the character 32 toward the object outside the vehicle. The controlling portion 30 basically gives priority to the sightline directed toward the occupant over the sightline directed toward the object outside the vehicle. That is, in a case where the sightline of the character 32 is directed toward the position of the occupant who makes an utterance, even if there is an object derived from the positional information of the vehicle and the attribute information of the driver around the vehicle, the controlling portion 30 keeps the sightline of the character 32 directed toward the occupant. Further, in a case where the sightline of the character 32 is directed toward the object derived from the positional information of the vehicle and the attribute information of the driver, when the controlling portion 30 acquires an utterance to request a session start from the occupant, the controlling portion 30 displays the character 32 so that the sightline of the character 32 is directed toward the occupant. Hereby, it is possible to avoid such a situation that the occupant who makes the utterance might feel to be ignored from the character 32 or might consider the agent program to malfunction.

In a case where the sightline of the character 32 is directed toward the position of the occupant who makes the utterance, when the controlling portion 30 receives information of an object that satisfies a predetermined release condition, the controlling portion 30 displays the character 32 so that the sightline of the character 32 is turned from the position of the occupant to the object. The predetermined release condition is satisfied when an object that can become an obstacle to vehicle running is detected, e.g., when an object projects ahead of the vehicle. As such, in a case where important supply information about running is derived, even when the driver talks with the character 32, provision of the supply information can have priority.

The sightline of the character 32 displayed on the head-up display as the display 16 may be displayed as a drawing pattern such as an arrow or a line so as to be superimposed on an actual scene, as illustrated in FIG. 1. Hereby, the sightline of the character 32 can be easily recognized.

In a case where a predetermined stop condition is satisfied at the time when the sightline of the character 32 displayed on the display 16 is directed toward the object, the controlling portion 30 stops displaying the sightline, of the character 32, that is directed toward the object. In a case where the predetermined stop condition is satisfied, the controlling portion 30 may control the character 32 not to be displayed or may return the sightline of the character 32 to a stand-by state while the character 32 is displayed. Note that, even when the controlling portion 30 stops displaying the sightline, of the character 32, that is directed toward the object, the controlling portion 30 may continue a session by the talk with the occupant.

The predetermined stop condition is satisfied when a detected drive operation amount is a predetermined threshold or more and/or a detected change amount of the drive operation amount is a predetermined threshold or more. Hereby, in a case where the driver suddenly steps a brake pedal or an accelerator pedal or in a case where the driver makes a sudden handle operation, the controlling portion 30 stops display of the character 32, so that the driver can focus on driving.

Further, the predetermined stop condition is satisfied in a case where an emergency situation occurs in vehicle running based on a detection result of the vehicle sensor 12. For example, in a case where a possibility of a collision with an obstacle placed ahead of the vehicle in its travelling direction becomes high or in a case where a violation of traffic regulations by the vehicle is detected, the controlling portion 30 stops display of the character 32 and outputs information to inform the driver about the presence of the obstacle.

Further, the predetermined stop condition is satisfied when the vehicle is braked by an automatic brake control. Hereby, when the automatic brake is performed, the controlling portion 30 stops display of the character 32 so as to make the driver pay attention to driving.

As such, when a vehicle running state exceeds a threshold and satisfies the predetermined stop condition based on the detection result of the vehicle sensor 12, the controlling portion 30 stops displaying the sightline, of the character 32, that is directed toward the object. Hereby, in a case where the driver looks at the display 16, the sightline, of the character 32, that is directed toward the object returns to a stand-by state or the character 32 stops being displayed, so that the driver stops looking at the display 16.

In a case where the vehicle running state returns to a normal state from the state where the vehicle running state exceeds the threshold, the controlling portion 30 allows the sightline of the character 32 to be displayed. At this time, the controlling portion 30 may display the character 32 so that the sightline of the character 32 is directed toward the object again or may not restart display of the sightline of the character 32 to be directed toward the object.

Note that the embodiment is just an example, and it is understandable for a person skilled in the art that the disclosure can be performed with various modifications by combining various constituents and such modifications are also within the scope of the disclosure.

The embodiment deals with a case where the holding portion 26 holds the attribute information of the driver, but the attribute information is not limited to this. The attribute information of the driver may be held by a server device to be connected to the display control device 10 via a network. Further, map information including guide information of the object may be also held by the server device. In any case, the attribute information of the driver and the map information are temporarily held by the display control device 10.

A display control device according to a first aspect of the disclosure includes circuitry configured to: acquire positional information of the vehicle; derive supply information about an object around the vehicle based on attribute information of a driver of the vehicle and the positional information, the supply information being supplied to the driver; display a character on the display; cause an output device to output the supply information; and display the character directing a sightline toward the object on the display.

In the above aspect, the circuitry may be configured to: acquire an utterance of an occupant, and display, on the display, the character directing the sightline toward a position of the occupant who makes the utterance.

In the above aspect, the circuitry may be configured to display, on the display, the character directing the sightline toward the position of the occupant in a case where the circuitry acquires the utterance, of the occupant, that requests the circuitry to start a session while the circuitry displays, on the display, the character directing the sightline toward the object indicated by the supply information.

In the above aspect, the circuitry may be configured to, in a case where a condition i) and a condition ii) are both satisfied, keep displaying, on the display, the character directing the sightline toward the occupant, the condition i) may be that the object is placed around the vehicle while the circuitry displays, on the display, the character directing the sightline toward the position of the occupant who makes the utterance, and the condition ii) may be that a predetermined condition is not satisfied.

In the above aspect, the output device may be at least one of the display or an in-vehicle speaker.

In the above aspect, the circuitry may be configured to display, on the display, the character directing the sightline toward the object around the vehicle in a case where the circuitry causes the output device to output the supply information.

In the above aspect, the circuitry may be configured to detect the position of the occupant in a case where the circuitry acquires the utterance, of the occupant, that requests the circuitry to start the session.

In the above aspect, the circuitry may be configured to change a direction of the sightline of the character from the position of the occupant who makes the utterance to the object around the vehicle when the predetermined condition is satisfied.

A display control method according to a second aspect of the disclosure is a method for displaying an image on a display mounted on a vehicle and controlled by a display control device. The display control method includes: acquiring, by the display control device, positional information of a vehicle; deriving, by the display control device, supply information about an object around the vehicle based on attribute information of a driver of the vehicle and the positional information, the supply information being supplied to the driver; outputting, by an output device, the supply information; and displaying, by the display control device, a character directing a sightline toward the object on the display.

What is claimed is:

1. A display control device configured to display an image on a display mounted on a vehicle, the display control device comprising circuitry configured to:
   acquire positional information of the vehicle;
   derive supply information about an object around the vehicle based on attribute information of a driver of the vehicle and the positional information, the supply information being supplied to the driver;

display a character on the display;
cause an output device to output the supply information; and
display the character directing a sightline toward the object on the display, wherein
the attribute information of the driver includes at least one of preference information of a food, preference information of a drink, and preference information of a good,
the character includes a single eye, and
the circuitry is configured to show the sightline toward the object on the display by adjusting at least one of a shape and a position of a pupil of the single eye.

2. The display control device according to claim 1, wherein the circuitry is configured to:
acquire an utterance of an occupant, and
display, on the display, the character directing the sightline toward a position of the occupant who makes the utterance.

3. The display control device according to claim 2, wherein the circuitry is configured to display, on the display, the character directing the sightline toward the position of the occupant in a case where the circuitry acquires the utterance, of the occupant, that requests the circuitry to start a session while the circuitry displays, on the display, the character directing the sightline toward the object indicated by the supply information.

4. The display control device according to claim 3, wherein the circuitry is configured to detect the position of the occupant in a case where the circuitry acquires the utterance, of the occupant, that requests the circuitry to start the session.

5. The display control device according to claim 2, wherein
the circuitry is configured to, in a case where a condition i) and a condition ii) are both satisfied, keep displaying, on the display, the character directing the sightline toward the occupant,
the condition i) is that the object is placed around the vehicle while the circuitry displays, on the display, the character directing the sightline toward the position of the occupant who makes the utterance, and
the condition ii) is that a predetermined condition is not satisfied.

6. The display control device according to claim 5, wherein the circuitry is configured to change a direction of the sightline of the character from the position of the occupant who makes the utterance to the object around the vehicle when the predetermined condition is satisfied.

7. The display control device according to claim 1, wherein the output device is at least one of the display or an in-vehicle speaker.

8. The display control device according to claim 1, wherein the circuitry is configured to display, on the display, the character directing the sightline toward the object around the vehicle in a case where the circuitry causes the output device to output the supply information.

9. The display control device according to claim 1, wherein the attribute information of the driver includes at least one of a sex of the driver and a generation of the driver.

10. The display control device according to claim 1, wherein the good is one of a consumer electronic and an automobile.

11. The display control device according to claim 1, wherein the circuitry is configured to show the sightline toward the object on the display by adjusting the shape and the position of the pupil.

12. The display control device according to claim 1, wherein the character includes a human or an animal.

13. A display control method for displaying an image on a display mounted on a vehicle and controlled by a display control device, the display control method comprising:
acquiring, by the display control device, positional information of a vehicle;
deriving, by the display control device, supply information about an object around the vehicle based on attribute information of a driver of the vehicle and the positional information, the supply information being supplied to the driver;
outputting, by an output device, the supply information; and
displaying, by the display control device, a character directing a sightline toward the object on the display, wherein
the attribute information of the driver includes at least one of preference information of a food, preference information of a drink, and preference information of a good,
the character includes a single eye, and
the method includes showing the sightline toward the object on the display by adjusting at least one of a shape and a position of a pupil of the single eye.

* * * * *